(12) United States Patent
Gniesmer

(10) Patent No.: US 9,238,283 B2
(45) Date of Patent: Jan. 19, 2016

(54) FRICTION WELDED STEEL PISTON HAVING OPTIMIZED COOLING CHANNEL

(75) Inventor: Volker Gniesmer, Alfeld (DE)

(73) Assignee: KS KOLBENSCHMIDT GMBH, Neckarsulm (DE)

( * ) Notice: Subject to any disclaimer, the term of this patent is extended or adjusted under 35 U.S.C. 154(b) by 109 days.

(21) Appl. No.: 13/055,231

(22) PCT Filed: Apr. 7, 2009

(86) PCT No.: PCT/EP2009/002536
§ 371 (c)(1),
(2), (4) Date: Mar. 23, 2011

(87) PCT Pub. No.: WO2010/009779
PCT Pub. Date: Jan. 28, 2010

(65) Prior Publication Data
US 2011/0185992 A1    Aug. 4, 2011

(30) Foreign Application Priority Data
Jul. 24, 2008 (DE) .................. 10 2008 034 430

(51) Int. Cl.
*F02F 3/00* (2006.01)
*B23P 15/10* (2006.01)
*F01P 1/04* (2006.01)

(52) U.S. Cl.
CPC . *B23P 15/10* (2013.01); *F01P 1/04* (2013.01); *Y10T 29/49249* (2015.01)

(58) Field of Classification Search
USPC ........... 123/41.39, 193.6; 29/888.04; 228/200
See application file for complete search history.

(56) References Cited

U.S. PATENT DOCUMENTS

| | | | |
|---|---|---|---|
| 2,991,769 A * | 7/1961 | Chapin ..................... | 123/41.35 |
| 6,032,619 A * | 3/2000 | Zhu et al. .................. | 123/41.35 |
| 6,155,157 A | 12/2000 | Jarrett | |

(Continued)

FOREIGN PATENT DOCUMENTS

| | | |
|---|---|---|
| DE | 3906582 C1 | 4/1990 |
| DE | 10346819 A1 | 4/2005 |

(Continued)

OTHER PUBLICATIONS

Machine Translation of WO 2007110056 A1 PDF File Name: "WO2007110056A1_Machine_Translation.pdf".*

(Continued)

*Primary Examiner* — Hung Q Nguyen
*Assistant Examiner* — Ruben Picon-Feliciano
(74) *Attorney, Agent, or Firm* — Young Basile Hanlon & MacFarlane

(57) ABSTRACT

A piston of an internal combustion engine includes a top part produced from steel and a bottom part, which are integrally bonded in the region of a contact geometry via joining webs by a friction weld to form a structural unit. At least one cooling duct permeated by a coolant is integrated in the piston, wherein a lubricating oil of the internal combustion engine passes as the coolant into an inlet opening via a free jet of an injection nozzle, flows through the cooling duct and leaves the cooling duct via an outlet opening. For the introduction of the coolant into the cooling duct, the inlet opening is assigned a flow pipe which is inserted in the bottom part and protrudes from a cooling duct base, the opening of the flow pipe being arranged above the weld beads of the friction weld.

11 Claims, 4 Drawing Sheets

(56) References Cited

U.S. PATENT DOCUMENTS

| | | |
|---|---|---|
| 6,722,263 B2 * | 4/2004 | Keller et al. ............... 92/186 |
| 2002/0027156 A1 * | 3/2002 | Coletta et al. ............ 228/114.5 |
| 2004/0016531 A1 | 1/2004 | Gerner |
| 2004/0168319 A1 | 9/2004 | Mielke |
| 2006/0000087 A1 | 1/2006 | Huang |
| 2007/0039460 A1 * | 2/2007 | Scharp ........................ 92/186 |
| 2008/0229923 A1 | 9/2008 | Gniesmer et al. |
| 2008/0245229 A1 | 10/2008 | Buschbeck et al. |
| 2008/0245231 A1 | 10/2008 | Gniesmer et al. |
| 2009/0241769 A1 | 10/2009 | Feeser |
| 2010/0037765 A1 | 2/2010 | Gniesmer et al. |
| 2010/0101527 A1 | 4/2010 | Gniesmer |
| 2010/0275873 A1 | 11/2010 | Gniesmer et al. |
| 2010/0299922 A1 | 12/2010 | Gniesmer et al. |

FOREIGN PATENT DOCUMENTS

| | | |
|---|---|---|
| GB | 1096826 A | 12/1967 |
| JP | 2005090448 A | 4/2005 |
| JP | 2006299979 A | 1/2011 |
| SU | 1283432 A1 | 1/1987 |
| WO | WO0004286 A1 | 1/2000 |
| WO | WO 2007110056 A1 * | 10/2007 |

OTHER PUBLICATIONS

International Search Report for PCTEP2009002536 Dated Mar. 8, 2009.

* cited by examiner

FRICTION WELDED STEEL PISTON HAVING OPTIMIZED COOLING CHANNEL

BACKGROUND

The invention relates to a piston of an internal combustion engine which is produced from steel and has a top part and a bottom part, the joining webs of which are integrally bonded in the region of a contact geometry by means of a friction weld to form a structural unit. For cooling, at least one cooling duct permeated by a coolant is integrated in the piston.

Zones of pistons for internal combustion engines which are subjected to high thermal loading, for example the combustion chamber cavity in the piston head or the region of the first groove, require effective cooling. For this purpose, it is known to integrate a cooling duct in the piston. A coolant, preferably the lubricating oil of the internal combustion engine, circulates through the cooling duct, which is preferably in the form of a hollow space. The efficiency of the piston cooling is governed, in particular, by the exchanged volume of the coolant in the cooling duct.

U.S. Pat. No. 6,155,157 discloses a cooling duct piston comprising two components which can be produced separately from one another and are joined together integrally via a friction welding process. The cooling duct provided is a rotationally symmetrical annular duct which is spaced apart circumferentially from the annular field of the piston and is permeated by a coolant, in particular the lubricating oil of the internal combustion engine, via an immovably positioned injection nozzle.

DE 39 06 582 C1 discloses a multi-part piston, the individual parts of which are connected by means of a friction weld so as to obtain an integral bond and a structural unit. In this process, the components are rubbed against one another under compressive loading, preferably by a rotary movement, until the contact geometry or the joining zone has reached the temperature suitable for welding the two components. The heating by rubbing is followed by a compression operation, in which the soft or molten regions of the components are torn open, plastically deformed and pressed onto one another. A weld bead which emerges from the contact geometry is thereby formed on both sides of the joining web.

Furthermore, there are pistons with a small compression height in which relatively short joining webs are established between the top part and the bottom part of the piston owing to the overall height of the piston. Owing to the confined installation space associated with this in the region of the contact geometry, there is the risk that the inlet and outlet openings of the cooling duct, which are formed as a bore, will taper off owing to the weld bead from the friction welding process. As a result, the exchange of coolant is reduced, and this is associated with a direct disadvantageous influence on the cooling of the piston.

It would be desirable to provide a cooling duct piston with an improved cooling action, in which the residence time of the coolant in the cooling duct is extended.

In one aspect, for the introduction of the coolant into the cooling duct, the inlet opening includes a flow pipe which is inserted in the bottom part. Here, the opening of the flow pipe, which protrudes from a cooling duct base with an excess length, is positioned above a contact geometry and its associated weld bead of the friction welding process.

The flow pipe is arranged in the contact geometry arising between the top part and the bottom part in such a way that it protrudes from a cooling duct base with an excess length. The extent of the excess length is selected in such a way that an opening of the flow pipe is positioned above a weld bead which arises by means of a friction weld, from a friction welding process. The exchange of coolant, which is decisive for the efficiency of the piston cooling, is therefore retained in an unrestricted manner, since no cross-sectional tapering, which has a negative effect on the cooling action of the piston, can be established owing to a weld bead in the region of the inlet opening of the cooling duct.

During an upward stroke of the piston, the coolant located in the cooling duct is pressed onto the cooling duct base owing to the acceleration of the piston. In this case, the installed position of the flow pipe prevents the return flow or exit of the coolant via the inlet opening of the cooling duct and ensures optimum filling of the cooling duct extending over a crank angle of 360°. At the same time, a disadvantageous influence on the flow owing to coolant exiting at the inlet opening, which leads to the foaming of oil, is prevented.

The reversal of the piston movement, which takes place rapidly in the top dead center of the piston, means that the coolant or lubricant located on the cooling duct base is hurled owing to the inertia action over a large area against the outer surface of the cooling duct which is formed, in particular, by a bottom side of the piston head. In combination with the alternating movements of the piston, the coolant acting on the entire cooling duct brings about optimization of the flow of coolant and also improved exploitation of the shaker action.

An increased residence time of the coolant (cooling oil) in the cooling duct and a reinforced shaker effect bring about an improved and desired dissipation of heat from the piston regions which are subjected to high thermal loading and are to be cooled.

The coolant which moves over the entire cooling duct ensures that the piston zones subjected to high thermal loading are effectively cooled without there being the risk of combustion of the coolant.

According to one aspect of the invention, a clearance "x" between the opening of the flow pipe and the cooling duct base exceeds a dimension "y", which defines a fill level of the coolant in an upward movement of the piston in the cooling duct. The differential dimension or clearance which is established ensures that disadvantageous return flow and an associated influence on the jet of the coolant in the region of the inlet opening is prevented irrespective of the direction in which the piston moves. Before the friction welding, the dimensionally stable flow pipe is arranged in a receiving bore of the bottom part of the piston in such a way that the clearance "x" is established after the latter is joined together with the top part of the piston.

Long-term fixing of the flow pipe takes place via a weld bead which is formed during the friction welding, by means of which the top part of the piston and the bottom part of the piston are integrally bonded to one another. A positively locking fastening can take place between the weld beads and the flow pipe in order to improve the fixing. For this purpose, the outer contour of the flow pipe has a recess intended for receiving the weld seam. An annular groove or a partially concave outer contour is preferably provided in order to constitute a recess which can be implemented at low cost.

In order to achieve optimum adaptation and positional fixing of the separate flow pipe in the piston, use is made of a pipe produced from steel. A material which is similar to the piston material in particular with respect to the coefficient of thermal expansion is selected for the flow pipe, and therefore reliable, play-free fastening is also ensured in the operating state of the internal combustion engine.

The flow pipe, which forms the inlet opening, is inserted in the bottom part of the piston and fixed via at least one weld bead and extends in the direction of the ends of the piston skirt. It is thereby possible to advantageously reduce the distance between the injection nozzle and the flow pipe, as a result of which it is possible to improve the effectiveness and the efficiency of the application of coolant via the injection nozzle into the flow pipe.

A further advantageous refinement provides for the flow pipe to be provided with a curved outlet opening on the cooling duct side. The flow pipe has two outlets, which point in opposite directions and are arranged in a Y-shape with respect to one another. This measure takes into account the rapid reversal of the piston movement at the bottom and top dead center and the associated transfer of the coolant between the cooling duct base and the outer surface of the cooling duct, which, if the flow pipe is arranged perpendicularly or parallel to a lateral surface of the piston, can have the effect that a sub-quantity of the coolant acts upon the flow pipe during the shaker movement. The flow pipe arched at the end with an outlet which is oriented preferably at an angle to the direction in which the piston moves or to a longitudinal axis of the piston prevents a disadvantageous inlet of coolant irrespective of the direction in which the piston moves. Furthermore, a flow pipe with two openings pointing in opposite directions adopts the function of a flow divider, which splits the flow of coolant in a targeted manner into two directions so that the latter acts uniformly on the annularly extending cooling duct.

In addition, the inlet opening can be transferred to a piston with a split cooling duct. For this purpose, each cooling duct half or each cooling duct segment is assigned an inlet opening and an outlet opening, each inlet opening preferably being assigned a separate injection nozzle. This design makes it possible for a relatively large flow of coolant to act on the cooling duct. Depending on the position of these openings, the coolant can flow through the cooling duct segments in cocurrent or in countercurrent.

A process for producing the piston, includes the following steps: firstly, a flow pipe is inserted into a receiving bore of the bottom part of the piston, where attention is paid to an installed position which ensures that the opening or the outlets of the flow pipe is or are arranged above a contact geometry. The top part and the bottom part of the piston are then assembled, before these components are joined together integrally by means of a friction weld. The weld beads that form in this process in the region of the contact geometry at least locally bring about nonpositive and/or positive fixing of the flow pipe.

BRIEF DESCRIPTION OF THE DRAWINGS

In the text which follows, the invention is explained in more detail on the basis of exemplary embodiments and with reference to the drawing, in which.

DETAILED DESCRIPTION

Figure 1:
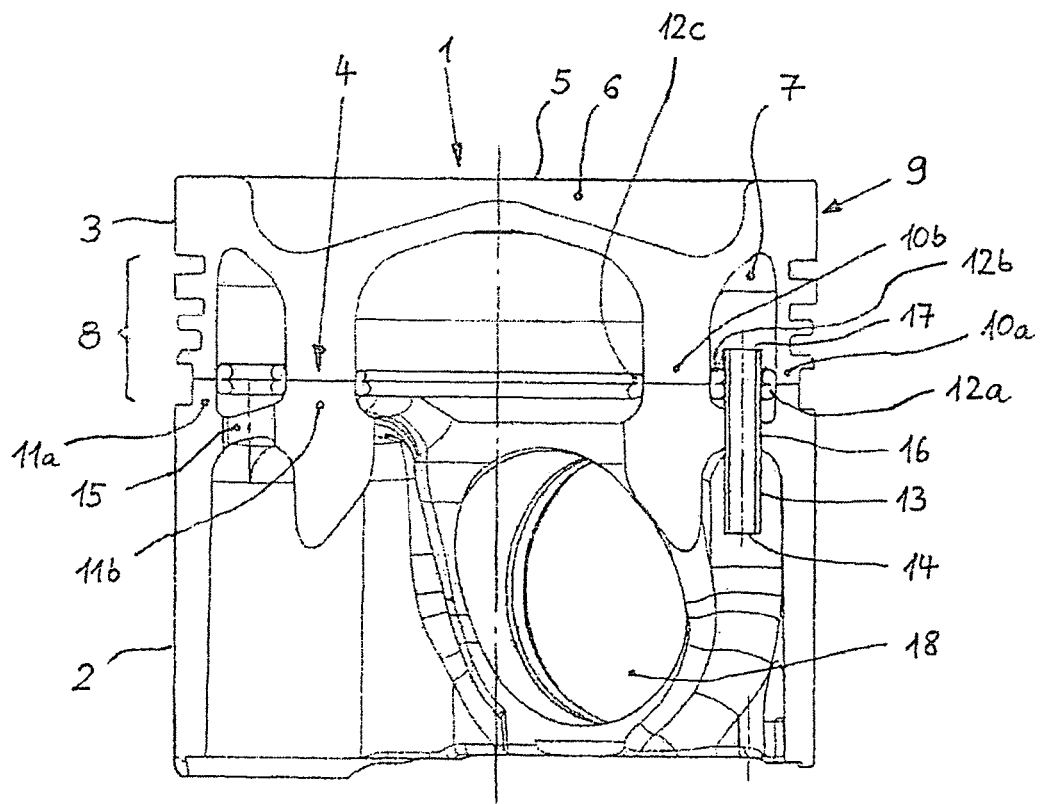
FIG. 1 shows a piston formed in half-section having a flow pipe assigned to the inlet opening of the cooling duct

FIG. 1 shows a piston 1 in a halved sectional view, consisting of a bottom part 2 and a top part 3 which are integrally bonded in the region of a contact geometry 4 by means of a friction weld to form a structural unit. The top part 3 of the piston 1 forms a combustion chamber cavity 6 in the region of a piston head 5. An annular cooling duct 7 integrated in the piston 1 extends into the bottom part 2, proceeding from the top part 3, and in the process extends at a radial distance from an annular field 8 introduced in an outer profile 9. The top part 3 includes joining webs 10a, 10b which extend rotationally symmetrically, are offset radially with respect to one another and, with corresponding joining webs 11a, 11b of the bottom part 2, form the contact geometry 4. The joining webs 10a, 10b, 11a, 11b are integrally bonded in the region of the contact geometry 4 by means of a friction weld (which is apparent from weld beads 12a, 12b, 12c) to form an integral structural unit.

Coolant is applied to the cooling duct 7 via an injection nozzle (not shown in FIG. 1), which is positioned in a stationary manner within the internal combustion engine and proceeding from which the coolant is introduced into an inlet opening 14 of the cooling duct 7 which includes a flow pipe 13. After the coolant has flowed through the cooling duct 7, it is discharged via an outlet opening 15. The flow pipe 13 is inserted in a receiving bore 16 of the bottom part 2 and extends beyond the contact geometry 4 on the cooling duct side. In the process, a position of an opening 17 of the flow pipe 13 is established above the weld beads 12a, 12b. In this installed position, the flow pipe 13 is fixed in position on both sides partially by the weld beads 12a, 12b in the region of the contact geometry 4. As a measure for improved introduction of the coolant into the flow pipe 13, the latter is extended in the direction of a pin hole 18.

Figure 2:
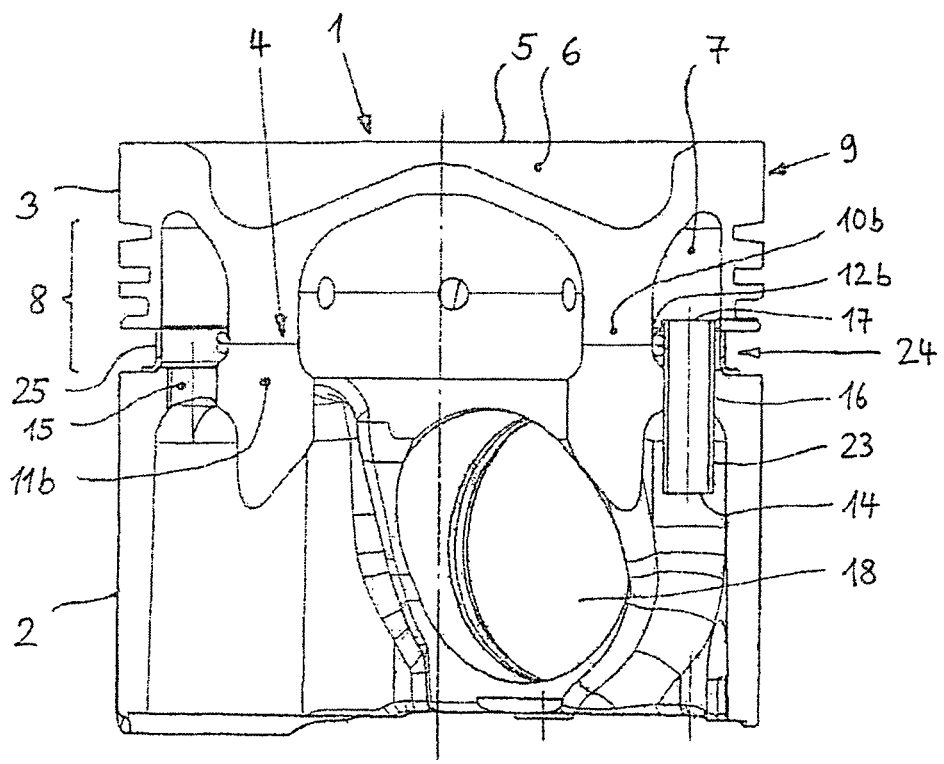
FIG. 2 is a similar view of the piston according to FIG. 1, with an alternatively arranged flow pipe.

Apart from the installed position of the flow pipe, the further exemplary embodiment shown in FIG. 2 is largely comparable to the piston 1 shown in FIG. 1. The same components are provided with matching reference numerals. The description of FIG. 2 is therefore restricted to the different arrangement of the flow pipe. The contact geometry 4 of the piston 1 is limited to the inner joining webs 10b, 11b. On the outside, a separate cover 25 closes off a cutout 24, which forms between the annular field 8 and the bottom part 2 and, at the same time, delimits the cooling duct 7. As a result of this, the flow pipe 23 is fixed on one side at the end oriented toward the cooling duct 7 by the weld bead 12b.

Figure 3:
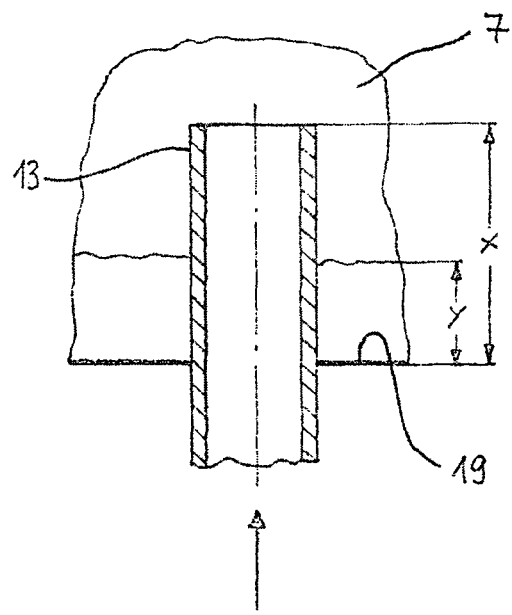
FIG. 3 shows a detail of the flow pipe in an enlarged illustration.

FIG. 3 shows an end region of the flow pipe 13 which protrudes into the cooling duct 7 and is extended with an excess length denoted by "x" with respect to a cooling duct base 19. This excess length clearly exceeds the coolant fill level denoted by "y". The differential dimension which is established effectively prevents return flow of coolant during an upward stroke of the piston 1.

Figure 4:
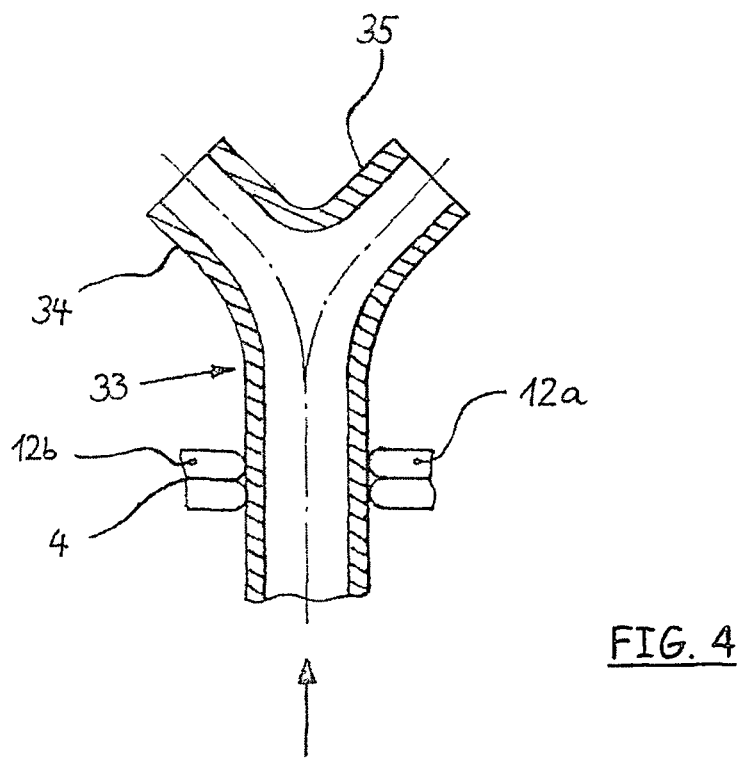
FIG. 4 shows a similar view of the flow pipe with two outlets arched at the end.

The flow pipe 33 shown in FIG. 4 includes two curved outlets 34, 35 at the end oriented toward the cooling duct 7. The outlets 34, 35, which are oriented oppositely to one another according to the extent of the cooling duct 7, prevent the ingress of coolant into the flow pipe 33 caused by the shaker effect. In addition, the outlets 34, 35 form a flow divider which splits the flow of coolant, as a result of which the annular cooling duct 7 is acted upon uniformly. In the installed position, the flow pipe 33 is fixed at least in certain regions by the weld beads 12a, 12b which form in the region of the contact geometry 4.

Figure 5:
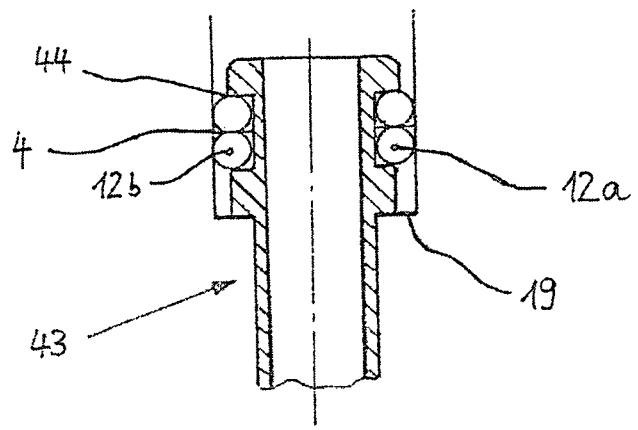
FIG. 5 shows a cross-sectioned portion of a flow pipe with an external annular groove intended for receiving weld beads.
Figure 6:
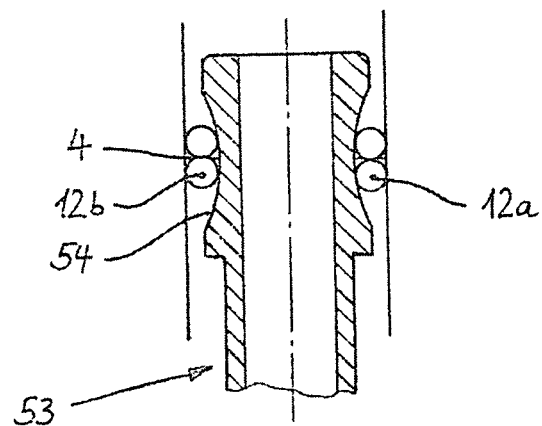
FIG. 6 shows a concave outer contour of a flow pipe in cross-section.

FIGS. 5 and 6 show the flow pipes 43 and 53, which accordingly include cutouts on the outside for receiving at least one weld bead 12a, 12b. The annular groove 44 provided according to FIG. 5 is positioned and dimensioned in the region of the contact geometry 4 such that said cutouts are largely filled by the weld beads 12a, 12b, in order to provide positively locking fastening of the flow pipe 43. As an alternative to the annular groove 44, the outside of the flow pipe 53 shown in FIG. 6 is provided with a concavely extending recess 54 which, in the installed state of the flow pipe 53, is provided for receiving the weld beads 12a, 12b in a positively locking manner.

The invention claimed is:

1. A piston of an internal combustion engine comprising:
a top part and a bottom part, at least one joining web, which is integrally bonded in the region of a contact geometry via a friction weld to form a structural unit, wherein at least one cooling duct permeated by a coolant is integrated in the piston and passing the coolant into an inlet opening, flows through the cooling duct and exits the cooling duct via an outlet opening, characterized in that;
for the introduction of the coolant into the cooling duct, the inlet opening includes a flow pipe which is inserted in the bottom part and protrudes from a cooling duct base with an excess length, wherein an outlet opening of the flow pipe is arranged above at least one weld bead of the friction weld; and
the flow pipe is fixed in a positively locking manner in an installed position by the at least one weld bead of the friction weld between the top part and the bottom part of the piston.

2. The piston as claimed in claim 1, characterized in that a clearance "x" between the outlet opening of the flow pipe and the cooling duct base exceeds a dimension "y", which defines a fill level of the coolant in the cooling duct during an upward movement of the piston.

3. The piston as claimed in claim 1, characterized in that the flow pipe is fixed at least on one side via the at least one weld bead.

4. The piston as claimed in claim 1, characterized in that an outer contour of the flow pipe has an annular groove adapted for receiving the at least one weld bead.

5. The piston as claimed in claim, 1 characterized in that an outer contour of the flow pipe includes a partially concave recess for receiving the at least one weld bead.

6. The piston as claimed in claim 1, characterized in that the flow pipe is produced from steel.

7. The piston as claimed in claim 1, characterized in that the flow pipe extends in the direction of a pin hole of the piston, proceeding from a receiving bore in the bottom part of the piston.

8. The piston as claimed in claim 1, characterized in that the flow pipe has two curved outlets extending in a y-shaped manner into the cooling duct.

9. The piston as claimed in claim 1, characterized in that the cooling duct is split into two cooling duct segment halves which are separated from one another and are each assigned an inlet opening and an outlet opening.

10. A method for producing a piston, characterized by the steps of:
inserting a flow pipe into a receiving bore of a bottom part of a piston;
fixing an installed position of the flow pipe such that one of an opening outlet thereof is arranged in an installed position above a contact geometry between a piston top part and the piston bottom part;
joining the top part and the bottom part together integrally at the contact geometry by means of a friction weld and
creating at least one weld bead by friction weld wherein the at least one weld bead of the friction weld fixes the flow pipe at least locally in a positively locking manner.

11. A piston of an internal combustion engine comprising:
a top part and a bottom part, at least one joining web, which is integrally bonded in the region of a contact geometry via a friction weld to form a structural unit, wherein at least one cooling duct permeated by a coolant is integrated in the piston and passing the coolant into an inlet opening, flows through the cooling duct and exits the cooling duct via an outlet opening, and the friction weld forming at least one weld bead disposed in the cooling duct characterized in that;
for the introduction of the coolant into the cooling duct, the inlet opening includes a flow pipe which is inserted in the bottom part and protrudes from a cooling duct base with an excess length, wherein an outlet opening of the flow pipe is arranged above at least one weld bead of the friction weld;
the flow pipe is fixed in a positively locking manner in an installed position by the at least one weld bead of the friction weld between the top part and the bottom part of the piston.

* * * * *